Sept. 15, 1959     R. C. ELLIS, JR     2,904,404
PREPARATION OF SILICON
Filed Jan. 9, 1957
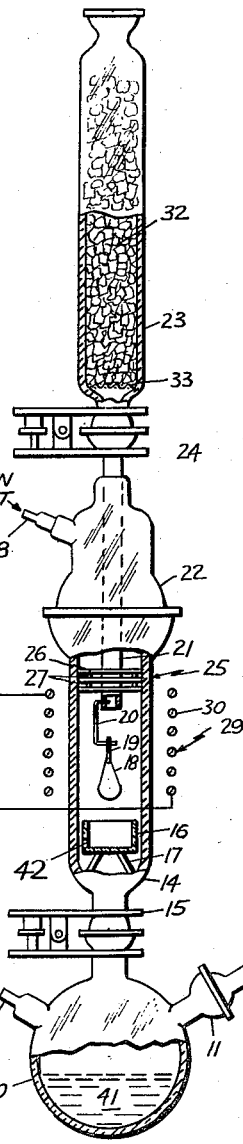
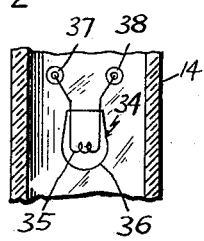
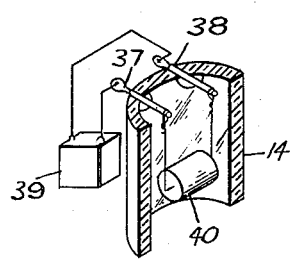
INVENTOR
RAY C. ELLIS, JR.
BY *Elmer J. Gorn*
ATTORNEY United States Patent Office 2,904,404
Patented Sept. 15, 1959

2,904,404
PREPARATION OF SILICON

Ray C. Ellis, Jr., Watertown, Mass., assignor to Raytheon Company, a corporation of Delaware Application January 9, 1957, Serial No. 633,314

8 Claims. (Cl. 23—223.5)

This invention relates to the preparation of substantially pure elemental silicon and, in particular, to the method and apparatus for preparing silicon by the reduction of the gas of a halogenated silane compound in a hydrogen-gas environment.

The present invention describes an apparatus for preparing substantially pure elemental silicon at highly efficient rates by the thermal decomposition of a gaseous, halogenated silane compound in the vicinity of a suitable heatable target placed in said gas, with the reaction taking place in an environment of excess hydrogen gas. The silicon recoverable by means of the aforementioned reaction is advantageous from the standpoint of both quality and quantity, is definitely an advancement in preparation of high grade commercial silicon, and is especially suitable for use in the field of semiconductors.

In accordance with the present invention, a noncontaminating body, functioning as a target, is heated in an environment comprised of the gas of a halogenated silane compound and hydrogen gas. The target is heated to an elevated temperature to thermally decompose the silicon-bearing gas in the vicinity of said target in order to deposit droplets of molten silicon on said target. Said droplets of molten silicon collect as a mass on the target and are mechanically unstable thereon because of their mass and the temperature of said target and, consequently, drip off said target. A collector is positioned under the target to collect said drippings. This method and the apparatus for accomplishing said method have several decided advantages over those known or practiced by the prior art. For example, with the exception of fluorinated silane compounds, the preparation of silicon can be conducted for the most part in glassware without contaminating the silicon generated thereby. The only requirement is that the collector be noncontaminating, and a substance, such as quartz, is readily adaptable for constructing said collector. Furthermore, by heating the target to a temperature whereby molten silicon, rather than crystalline silicon, is generated from said silicon-bearing gas, silicon is recoverable from the reaction as a substantially uncontaminated, integral mass. In contrast, in reduction reactions known and practiced in the prior art wherein the crystalline silicon formed is deposited at lower temperatures on a heated wire or on the walls of a noncontaminating substance, such as a quartz tube, said silicon has to be removed from said wire or quartz tube. In the first instance, the use of a wire does not lend itself to producing silicon in sufficient quantities for a successful commercial operation. Secondly, the use of a wire necessarily contaminates the silicon recoverable therefrom; and thirdly, if flexing said wire or sawing the silicon deposited thereon is employed for recovery therefrom, not only is the yield contaminated by the wire and unsatisfactory for large scale preparation of silicon, but the wire can only be used once. While the use of mechanical vibrations to recover silicon from said wire is an improvement in the method of recovery, still said silicon is inherently contaminated by the wire employed. Similarly, apparatus wherein a quartz tube is used has the serious limitation of having to dismantle the apparatus to remove silicon deposited therein, and said method necessarily does not eliminate many of the defects described in connection with the use of a heatable wire. In summation, in accordance with the present invention, high yields of substantially pure silicon can be prepared by a method and an apparatus suitable for a commercial operation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Fig. 1 is a cross-sectional view of an apparatus for preparing silicon by a hydrogen-reduction technique;

Fig. 2 is a cross-sectional view of the inside portion of one wall of the apparatus wherein is depicted a filament-type, clad target; and Fig. 3 is a perspective view of the inside portion of one wall of the apparatus wherein is depicted a resistance-type target.

Referring now to Fig. 1, there is shown one embodiment of the present invention. A glass container functions as a boiler 10 for the preparation of the gas of a halogenated silane compound from which silicon is produced. An input 11 may be integrally formed as part of the boiler 10 and is terminated in a female joint. An inlet tube 12, terminated with a male joint, mates with said female joint. Said male and female joints are employed for the same purposes as described in a previously-filed application, Serial No. 628,345, by Leverton and Ellis. A suitable silane compound, to be discussed subsequently, may be fed into the boiler via the inlet tube 12, which tube may terminate at a reactor (not shown) for generating said compound or a receiver (not shown) for storing said compound. An inlet 13 also may be integrally formed as part of the boiler for connection to a source of hydrogen gas for the preparation of silicon from a class of halogenated silane compounds, to be described subsequently, which are vaporized in an environment of excess hydrogen gas. Said boiler is terminated in a female joint which mates with the male joint of a glass reactor chamber 14. A clamp 15 holds the boiler and the reactor chamber in position. The portion of the chamber adjacent the male joint is preferably enlarged and shaped so that a collector 16 may be mounted in said portion of the chamber. The collector 16 is preferably made of a substance that is noncontaminating to silicon, and which will not decompose during the preparation of silicon. Quartz is a suitable substance for the collector 16 and for the legs 17 supporting said collector within the chamber. Said collector is preferably a cylindrically-shaped container of lesser diameter than the chamber to enable gases evolved in the boiler to rise into the area wherein a heatable body, functioning as a target 18, is positioned. The target is preferably chemically inert to silicon and heatable to a suitable temperature to prepare molten silicon. Said target may be suspended above the collector by means of a noncontaminating, high-melting substance, such as molybdenum wire 19, threaded through holes in said target. The target 18 may be made from carbon or silicon carbide, which are noncontaminating as suitable substances, as described in said aforementioned application. The wire 19 can be looped around one end by a hook 20 which, in turn, is secured in a conduit 21, or the target may be suspended in any of a multitude of ways, which will suggest themselves to persons constructing such an apparatus. The hook may be made of a noncontaminating substance, such as molybdenum or quartz. The conduit 21 runs through a lid 22 of the reactor chamber and is terminated in a female joint. The lid 22 may be terminated with a male joint to mate with the female joint of the reactor chamber. Said conduit 21 provides a passageway for gases in said reactor chamber to rise into a defractionating column 23, which has a male joint attached to the female joint of said conduit. The conduit and the defractionating column are secured in place by a clamp 24. Gases within the reactor chamber are prevented from rising into the lid by a baffle 25, comprising discs 26, separated by rods 27, and including said conduit which is secured thereto. An inlet 28 may be integrally formed as part of the lid 22 for admitting a stream of hydrogen gas to the reactor chamber. The hydrogen gas is used to prevent gases collecting in the reactor chamber 14 from rising into the lid 22. Under the pressure of said hydrogen gas, gases in the reactor chamber flow into the defractionating column. The conduit and baffles may be made of glass, except when a fluorinated silane compound is used, as will be explained subsequently.

An inductive heating device 29, comprised of windings 30 connected to a high frequency generator 31, is mounted in a manner to have the portion of the reactor chamber, wherein the target 18 is located, positioned within the air core of said windings. The device 29 is used to heat the target in order to decompose the silicon-bearing gas in the vicinity of said target, and in order to deposit silicon therefrom on said target.

The defractionating column 23 is filled with glass beads 32, having a substantially large surface area, for separating silicon-bearing gas from gaseous byproducts of the reaction by means of the difference in their boiling points. The beads are supported on a high-melting point mesh plate 33, which may be made of molybdenum. The defractionating column can be terminated in a suitable recovery apparatus (not shown), which may include any of the known devices for cooling the lower boiling halogenated gas escaping liquification in said defractionating column. Such a recovery apparatus may include a large condenser filled with liquid air to liquify said gases, and the liquid may be stored in a suitable receiver.

Other targets may be used with other means for heating said targets, as is shown in Figs. 2 and 3. A clad target 34 is shown in Fig. 2. Said target may be comprised of a filament 35 encapsulated in a noncontaminating, heatable substance, such as a ceramic shell 36. The filament may be connected to terminals 37 and 38 embedded in the reactor chamber, as shown best in Fig. 3. The terminals 37 and 38, as well as the leads connected thereto, should be noncontaminating to silicon, and may extend into the interior of the reactor chamber so that said target can be suspended therefrom. Said terminals 37 and 38 may be connected to an A.C. or D.C. source 39, as shown in Fig. 3, for a resistance-type target 40. It should be noted at this point that a teardrop or pear-shaped target configuration has been found to be preferably for targets including carbon, as is explained in said aforementioned application. This preferred shape need not be used with clad target, shown in Fig. 2. However, it may be necessary and also desirable to reshape a target comprised of carbon, as shown in Fig. 3, to obtain sufficient resistance for the required temperature at which silicon can be prepared for a particular reaction when the target is to be heated by connection to an electric current source.

The hydrogen reduction reaction for preparing silicon is applicable to halogenated silane compounds, having similar or dissimilar halogen elements attached to one or more silicon atoms, or having one or more hydrogen atoms and similar halogen atoms, or dissimilar halogen atoms attached to one or more silicon atoms. A generic formula for the halogenated silanes may be characterized as $Si_AX_B$, in which $X_B$ is the only element dissimilar from silicon which is attached to the $Si_A$ atom, and where:

$Si$ = silicon with a valence of plus four
$X$ = a particular halogen, or dissimilar halogens
$A$ = the number of silicon atoms
$B$ = the number of similar or dissimilar halogen atoms.

B is related to A by the equation $B=2(A+1)$. An example of a halogenated silane compound having a single silicon atom is tetrabromosilane, $SiBr_4$; an example of a halogenated silane compound having two silicon atoms is hexachlorosilane, $Si_2Cl_6$. Additionally, the formula $Si_AH_CX_B$ may characterize the halogenated silanes having hydrogen in combination with said similar or dissimilar halogens. Said symbols $Si_A$ and $X_B$ have the same definition as aforementioned and $H_C$ is the number of hydrogen atoms in combination therewith. In the formula $Si_AH_CX_B$, the quantities $X_B$ and $H_C$ are the only elements dissimilar from silicon which are attached to the $Si_A$ atom. In these compounds, C will range from one to $2(A+1)$. An example of a halogenated silane compound including a single hydrogen and a single silicon atom is silicobromoform, $SiHBr_3$; an example of a halogenated silane compound having a plurality of halogen atoms, a plurality of hydrogen atoms, and a plurality of silicon atoms is dichlorodisilane, $Si_2Cl_2H_4$.

The embodiment of the invention previously described wherein glass components are employed is not suitable for preparing silicon by the method described in the present invention when a fluorinated silane compound is used. The byproducts of said silane compound will react unfavorably with said glass and, thus, preclude the use of glass. However, other substances not damaged by contact with hydrofluoric acid, such as the noble metals, may be used for constructing an apparatus for the preparation of silicon without departing from the scope of the present invention. Pursuant to the present invention, by way of illustration of the function of the apparatus previously described, a source of hydrogen gas is fed to the inlet tube 13 to purge the boiler and the reactor chamber of contaminating gaseous elements, and to have the vaporization of the silane compound selected for the preparation of silicon occur in an environment of excess hydrogen gas. A quantity of a suitable halogenated silane compound, such as tetrachlorosilane, $SiCl_4$, which is a liquid 41 at room temperature and atmospheric pressure, is admitted via inlet tube 12 and inlet 11 to the boiler. As aforementioned, said inlet tube may be connected to a receiver for storing said compound or to a reactor for generating said compound. Simultaneous with energizing the generator 31 for heating the target, heating means such as a mantle (not shown) can be positioned exteriorly to said boiler for heating said liquid to provide the gas of said liquid and a constant flow of said gas past the target. Additionally, a supply of hydrogen gas is fed into the lid 22 at the inlet 28 for the purpose previously mentioned. Excess hydrogen gas is required for the reduction of tetravalent silicon to elemental silicon and for combination with chlorine evolved in the reaction. The reaction is characterized by the equation $$SiCl_4 + 2H_2 \rightarrow Si + 4HCl$$

In the vicinity of 60° C., tetrachlorosilane gas is readily evolved, and a constant stream of said gas passes the target in the reactor chamber. The target, on the other hand, is heated by the inductance device 29 to approximately 1400° C., at which temperature said gas is thermally decomposed, and molten silicon in the form of droplets collects on said target. Said molten silicon droplets collect as a mass at the bulb-end of said target 18, and soon begin to sag and drop therefrom as the mass increases. Drippings are collected in the noncontaminating collector 16 during the course of the reaction. Unreacted gaseous tetrachlorosilane and any other unreduced silane compounds rising into the defractionating column 23 are liquified therein and returned to the reactor. A hole 42 in one corner of the collector is provided to allow liquids other than silicon collecting in said collector to drain out. The lower boiling gaseous hydrochloric acid formed as a byproduct of the reaction is not liquified in the column, but rises into the recovery apparatus previously mentioned, wherein liquification occurs.

The reaction previously described proceeds in the same manner when a halogenated silane compound including dissimilar halogen atoms is employed, except that the gaseous byproducts of the reaction will be the acids of said dissimilar halogens. Likewise, the reaction will be the same if the halogenated silane compound includes hydrogen. An example of said reaction involving trichlorosilane, $SiHCl_3$, is characterized by $$SiHCl_3 + H_2 \rightarrow Si + 3HCl$$

In instances where a fluorinated silane compound is employed, the apparatus may be constructed from a substance other than glass, such as the noble metals, but the use of said silane compound will not depart from the principles of the present invention.

Having described an apparatus for preparing silicon by a hydrogen reduction process, and having described alternatives for the selection and heating of the target and the halogenated silane compounds applicable to the technique described herein, it is desired that the appended claims be given a broad interpretation commensurate with the principles described herein.

What is claimed is:

1. The method of preparing silicon comprising the steps of maintaining a halogenated silane compound as a gas in an environment of hydrogen gas, passing said gasses past a body chemically inert to silicon, heating said body to a suitable temperature ranging from at least the melting point of silicon to temperatures substantially above said melting point to decompose the silicon-bearing gas in the vicinity of said body to form molten silicon therefrom on said body, continuously separating said molten silicon from the area wherein reaction is occurring, and collecting said molten silicon from said body while maintaining said body in said temperature range.

2. The method of preparing silicon comprising the steps of maintaining a compound consisting of a halogengated silane containing at least one hydrogen as a gas in an environment of hydrogen gas, passing said gasses past a chemically noncontaminating and integrally-formed heatable body, heating said body to a suitable temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

3. The method of preparing silicon comprising the steps of maintaining a halogenated silane compound consisting of dissimilar atoms from the halogen group attached to a silicon atom as a gas in an environment of hydrogen gas, passing said gasses past a chemically noncontaminating and integrally-formed heatable body, heating said body to a temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

4. The method of preparing silicon comprising the steps of maintaining a halogenated silane compound consisting of at least one hydrogen atom and similar atoms from the halogen group attached to a silicon atom as a gas in an environment of hydrogen gas, passing said gasses past an integrally-formed heatable body, said body being chemically unreactive and noncontaminating to silicon, heating said body to a suitable temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

5. The method of preparing silicon comprising the steps of maintaining a halogenated silane compound as a gas in an environment of hydrogen gas, passing said gasses past a chemically noncontaminating and integrally-formed heatable body including carbon, heating the body to a suitable temperature ranging from at least the melting point of silicon to temperatures substantially above said melting point to decompose the silicon-bearing gas in the vicinity of said target and to form molten silicon therefrom on said body, continuously separating said molten silicon from the area wherein reaction is occurring, and collecting said molten silicon from said body while maintaining said body in said temperature range.

6. The method of preparing silicon comprising the steps of maintaining a halogenated silane compound as a gas in an environment of hydrogen gas, passing said gasses past a chemically noncontaminating and integrally-formed heatable body having a teardrop configuration, heating said body to a suitable temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

7. The method of preparing silicon comprising the steps of maintaining a halogenated silane compound as a gas in an environment of hydrogen gas, passing said gasses past a chemically noncontaminating and integrally-formed heatable body including carbon and having a teardrop configuration, heating said body to a suitable temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

8. The method of preparing silicon comprising the steps of maintaining a halogenated silane compound as a gas in an environment of hydrogen gas, passing said gasses past a chemically noncontaminating and integrally-formed heatable body, inductively heating said body to a suitable temperature ranging from at least the melting point of silicon to temperatures substantially above said melting point to decompose the silicon-bearing gas in the vicinity of said body and to form molten silicon therefrom on said body, continuously separating said molten silicon from the area wherein reaction is occurring, and collecting said molten silicon from said body while maintaining said body in said temperature range.

References Cited in the file of this patent

UNITED STATES PATENTS

| | | |
|---|---|---|
| 2,438,892 | Becker | Apr. 6, 1948 |
| 2,686,864 | Wroughton et al. | Aug. 17, 1954 |